(12) United States Patent
Sakai et al.

(10) Patent No.: US 11,981,206 B2
(45) Date of Patent: May 14, 2024

(54) VEHICLE DISPLAY CONTROL DEVICE, CONTROL METHOD OF VEHICLE DISPLAY CONTROL DEVICE, AND STORAGE MEDIUM

(71) Applicant: HONDA MOTOR CO., LTD., Tokyo (JP)

(72) Inventors: Yuya Sakai, Tokyo (JP); Satoko Yokochi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 306 days.

(21) Appl. No.: 17/671,628

(22) Filed: Feb. 15, 2022

(65) Prior Publication Data

US 2022/0305911 A1    Sep. 29, 2022

(30) Foreign Application Priority Data

Mar. 25, 2021 (JP) ................ 2021-051617

(51) Int. Cl.
| | |
|---|---|
| *G06T 11/00* | (2006.01) |
| *B60K 35/00* | (2006.01) |
| *B60K 35/28* | (2024.01) |
| *B60K 35/29* | (2024.01) |
| *B60K 35/81* | (2024.01) |
| *G06V 20/56* | (2022.01) |
| *G06V 20/58* | (2022.01) |

(52) U.S. Cl.
CPC ............ *B60K 35/00* (2013.01); *G06T 11/00* (2013.01); *B60K 35/28* (2024.01); *B60K 35/29* (2024.01); *B60K 35/81* (2024.01); *B60K 2360/166* (2024.01); *B60K 2360/167* (2024.01); *B60K 2360/171* (2024.01); *B60K 2360/18* (2024.01); *G06V 20/58* (2022.01); *G06V 20/588* (2022.01); *G06V 2201/08* (2022.01)

(58) Field of Classification Search
None
See application file for complete search history.

(56) References Cited

U.S. PATENT DOCUMENTS

| 2004/0257442 A1* | 12/2004 | Eggers | G06V 20/597 |
| | | | 348/148 |
| 2016/0012298 A1* | 1/2016 | Maeda | G06T 7/60 |
| | | | 382/104 |
| 2021/0146839 A1* | 5/2021 | Kim | B60K 35/00 |
| 2022/0194369 A1* | 6/2022 | Choi | B60W 40/072 |

FOREIGN PATENT DOCUMENTS

JP    07-223488    8/1995

* cited by examiner

*Primary Examiner* — Robert J Craddock
(74) *Attorney, Agent, or Firm* — Amin, Turocy & Watson, LLP (57) ABSTRACT

A vehicle display control device includes a processor configured to execute computer-readable instructions to perform. The processor is configured to estimating curvature of a road on which a host vehicle will travel based on at least an output of a detection device that detects a target object present in a traveling direction of the host vehicle, causing a display device to display a surrounding situation display image including a host vehicle icon representing the host vehicle and an image of a road marking whose shape is determined based on the curvature, and decreasing reference curvature of the image of the road marking included in the surrounding situation display image if a prescribed condition is satisfied.

12 Claims, 5 Drawing Sheets

VEHICLE DISPLAY CONTROL DEVICE, CONTROL METHOD OF VEHICLE DISPLAY CONTROL DEVICE, AND STORAGE MEDIUM

CROSS-REFERENCE TO RELATED APPLICATION

Priority is claimed on Japanese Patent Application No. 2021-051617, filed Mar. 25, 2021, the content of which is incorporated herein by reference.

BACKGROUND OF THE INVENTION

Field of the Invention

The present invention relates to a vehicle display control device, a control method of the vehicle display control device, and a storage medium.

Description of Related Art

Conventionally, technology associated with a vehicle display device that presents a relative positional relationship associated with another vehicle traveling near or in front of a host vehicle to a driver or the like has been disclosed (for example, see Japanese Unexamined Patent Application, First Publication No. H7-223488). In the conventional technology, the situation of surroundings of the host vehicle is detected and an image showing the situation of the surroundings including a lane in which the host vehicle is traveling and the host vehicle is displayed on the display device. Thereby, in the conventional technology, the driver or the like can easily ascertain the situation of the surroundings including a positional relationship associated with another vehicle traveling in front of the host vehicle.

However, the situation of the surroundings of the host vehicle shown in the conventional technology is a situation obtained by faithfully reproducing and presenting a detected situation. Thus, for example, when a lane in which the vehicle is traveling is curved or the like, the position of the curved lane or another vehicle traveling in front of the vehicle may be outside of an information display area. In this case, in conventional technology, it becomes impossible to present a situation of the position outside of the display area to the driver. As described above, in conventional technology, it may not be possible for the driver to recognize a relative positional relationship associated with surroundings of a host vehicle or another vehicle.

SUMMARY OF THE INVENTION

The present invention has been made on the basis of the recognition of the above-described problems and an objective of the present invention is to provide a vehicle display control device, a control method of the vehicle display control device, and a storage medium capable of allowing a driver to recognize a relative positional relationship associated with surroundings of a host vehicle or another vehicle.

A vehicle display control device, a control method of the vehicle display control device, and a storage medium according to the present invention adopt the following configurations.

(1): According to an aspect of the present invention, there is provided a vehicle display control device including a processor configured to execute computer-readable instructions to perform: estimating curvature of a road on which a host vehicle will travel based on at least an output of a detection device that detects a target object present in a traveling direction of the host vehicle; causing a display device to display a surrounding situation display image including a host vehicle icon representing the host vehicle and an image of a road marking whose shape is determined based on the curvature; and decreasing reference curvature of the image of the road marking included in the surrounding situation display image if a prescribed condition is satisfied.

(2): In the above-described aspect (1), the prescribed condition is a condition in which the estimated curvature is greater than or equal to a prescribed value.

(3): In the above-described aspect (1) or (2), the display device displays a traveling state display image on at least one of left and right sides of the surrounding situation display image, the prescribed condition is a condition in which the image of the road marking overlaps the traveling state display image when the shape of the image of the road marking has been determined based on the estimated curvature, and the processor is configured to execute the computer-readable instructions to perform: decreasing the curvature to curvature at which the image of the road marking does not overlap the traveling state display image if the prescribed condition is satisfied.

(4): In any one of the above-described aspects (1) to (3), the display device displays two traveling state display images on left and right sides of the surrounding situation display image, and the processor is configured to execute the computer-readable instructions to perform: causing the surrounding situation display image to be displayed at a position between the two traveling state display images.

(5): In any one of the above-described aspects (1) to (4), the processor is configured to execute the computer-readable instructions to perform: detecting center positions of the road in the traveling direction in which the host vehicle travels based on the output of the detection device, estimating the curvature of the road based on a centerline connecting the center positions.

(6): In any one of the above-described aspects (1) to (5), the processor is configured to execute the computer-readable instructions to perform: estimating the curvature of the road based on map information indicating a route along which the host vehicle travels.

(7): In any one of the above-described aspects (1) to (6), the processor is configured to execute the computer-readable instructions to perform: estimating the curvature of the road at a time point when the host vehicle is traveling on a straight road whose curvature is less than a prescribed value and there is a curved road whose curvature is greater than or equal to the prescribed value on a traveling direction side, and decreasing the reference curvature of the image of the road marking included in the surrounding situation display image from a point before a point where the curved road is present.

(8): In any one of the above-described aspects (1) to (7), the target object further includes another vehicle that travels in front of the host vehicle, the processor is configured to execute the computer-readable instructions to perform: including another vehicle icon representing the another vehicle at a position within the surrounding situation display image corresponding to a position where the another vehicle is present; and including a tracking icon representing that the host vehicle is tracking the another vehicle at a position near the another vehicle icon in the surrounding situation display image when the host vehicle is traveling while tracking the another vehicle and causes the display device to display the surrounding situation display image.

(9): In the above-described aspect (8), the prescribed condition is a condition in which at least a part of the another vehicle icon overlaps a traveling state display image when the tracking icon is included in the surrounding situation display image, and the processor is configured to execute the computer-readable instructions to perform: causing the another vehicle icon and the tracking icon to be moved to positions where the another vehicle icon and the tracking icon do not overlap the traveling state display image when the prescribed condition is satisfied and decreases the curvature of the image of the road marking in accordance with the another vehicle icon and the tracking icon that have been moved.

(10): In the above-described aspect (9), the processor is configured to execute the computer-readable instructions to perform: causing the another vehicle icon and the tracking icon to be moved to cause at least the another vehicle icon included in the surrounding situation display image does not completely overlap the traveling state display image and a part of the tracking icon is included in the surrounding situation display image.

(11): According to an aspect of the present invention, there is provided a control method of a vehicle display control device including: estimating, by a computer, curvature of a road on which a host vehicle will travel based on at least an output of a detection device that detects a target object present in a traveling direction of the host vehicle; and when a display device is allowed to display a surrounding situation display image including a host vehicle icon representing the host vehicle and an image of a road marking whose shape is determined based on the curvature, decreasing, by the computer, reference curvature of the image of the road marking included in the surrounding situation display image if a prescribed condition is satisfied.

(12): According to an aspect of the present invention, there is provided a non-transitory computer-readable storage medium storing a program for causing a computer to: estimate curvature of a road on which a host vehicle will travel based on at least an output of a detection device that detects a target object present in a traveling direction of the host vehicle; and when a display device is allowed to display a surrounding situation display image including a host vehicle icon representing the host vehicle and an image of a road marking whose shape is determined based on the curvature, decrease reference curvature of the image of the road marking included in the surrounding situation display image if a prescribed condition is satisfied.

According to the above-described aspects (1) to (12), a driver can be allowed to recognize a relative positional relationship associated with surroundings of a host vehicle or another vehicle.

DETAILED DESCRIPTION OF THE INVENTION

Hereinafter, embodiments of a vehicle display control device, a control method of the vehicle display control device, and a storage medium of the present invention will be described with reference to the drawings.

As used throughout this disclosure, the singular forms "a," "an," and "the" include plural reference unless the context clearly dictates otherwise.

[Configuration of Vehicle Display Control Device]

Figure 1:
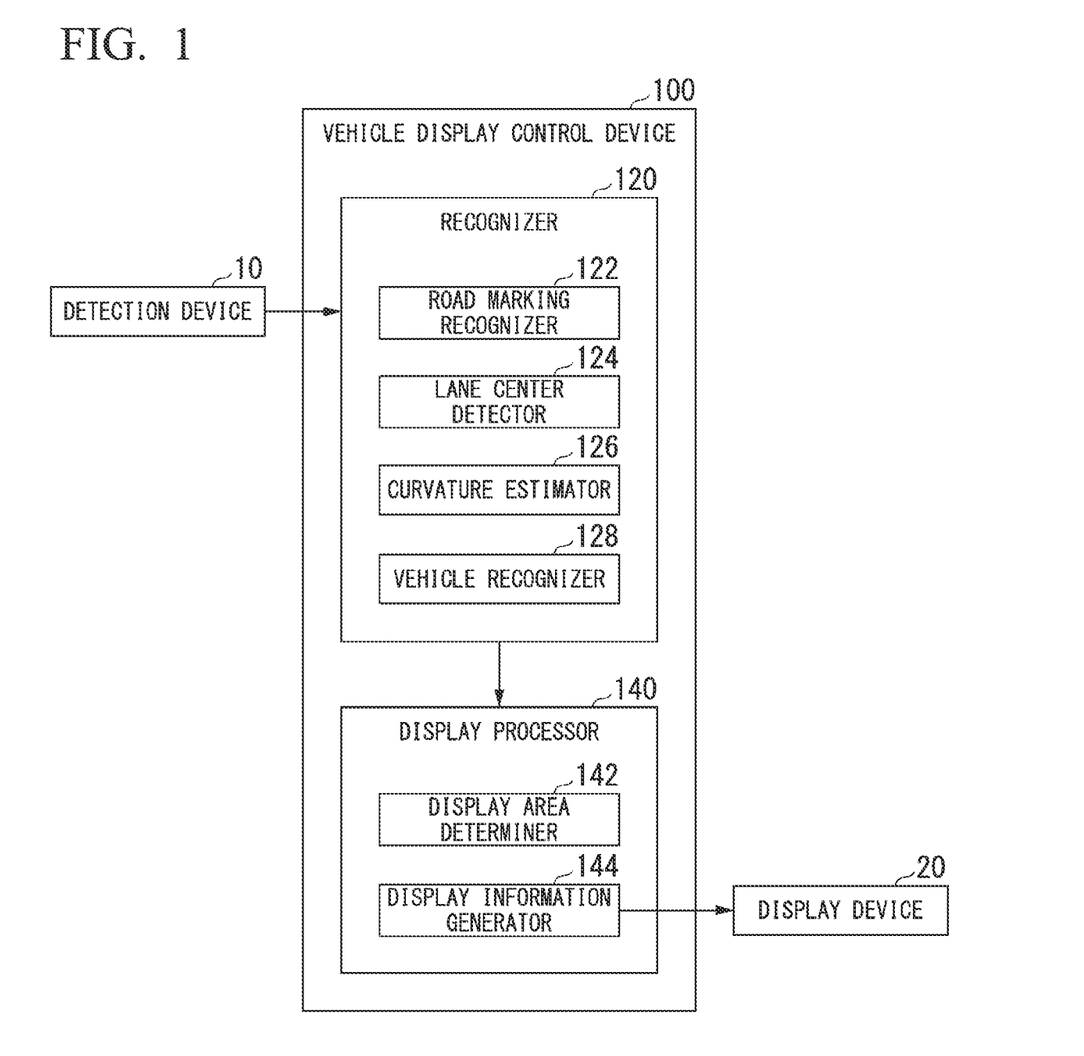
FIG. 1 is a schematic configuration diagram of a vehicle display control device according to an embodiment.

FIG. 1 is a schematic configuration diagram of the vehicle display control device according to an embodiment. A vehicle in which the vehicle display control device is mounted is, for example, a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged.

In FIG. 1, a detection device 10 and a display device 20 are shown as components associated with the vehicle display control device 100 among components provided in the vehicle (hereinafter referred to as a "host vehicle M") in which the vehicle display control device 100 is mounted.

The detection device 10 detects target objects present in a traveling direction of the host vehicle M. The target objects include, for example, road markings drawn on a road on which the host vehicle M is traveling, a lane distinguished by the road markings, or another vehicle (hereinafter referred to as "another vehicle V") traveling in the same direction as the host vehicle M. The detection device 10 is, for example, a digital camera using a solid-state image sensor such as a charge-coupled device (CCD) or a complementary metal-oxide semiconductor (CMOS). In this case, the detection device 10 is attached to at least any location where the view in front of the host vehicle M can be imaged. The detection device 10 is attached to, for example, an upper part of a front windshield, a rear surface of a rearview mirror, or the like. The detection device 10 periodically and repeatedly images the surroundings of the host vehicle M, for example, at prescribed time intervals. The detection device 10 may be a stereo camera. The detection device 10 outputs image data obtained in an imaging process thereof to the vehicle display control device 100. The detection device 10 may output information indicating the detected target objects to the vehicle display control device 100. In addition to the camera, the detection device 10 may include a radar device for detecting the world outside of the vehicle or a light detection and ranging (LIDAR) sensor and may be a structure in which an automated position recognition device is combined with a high-precision map and the like obtained in an in-vehicle or server communication process and the like. In this case, the vehicle width and curvature in the traveling direction can be detected by identifying the host vehicle position on the high-precision map.

The display device 20 displays an information image showing various types of information presented to the driver of the host vehicle M. The display device 20 is, for example, a display device such as a liquid crystal display (LCD) incorporated in a dashboard or an instrument panel of the host vehicle M. The display device 20 displays a traveling state display image showing a traveling state of the host vehicle M and a surrounding situation display image showing a situation of surroundings of the host vehicle M output by the vehicle display control device 100. The traveling state display image includes, for example, an image of a speedometer indicating a speed at which the host vehicle M is traveling, and a tachometer indicating the number of rotations (a rotational speed) of the internal combustion engine provided in the host vehicle M. The traveling state display image may include, for example, an image of a fuel consumption meter, an odometer, a clock, and the like.

The vehicle display control device 100 includes, for example, a recognizer 120 and a display processor 140. The recognizer 120 includes, for example, a road marking recognizer 122, a lane center detector 124, a curvature estimator 126, and a vehicle recognizer 128. The display processor 140 includes, for example, a display area determiner 142 and a display information generator 144. These components are implemented, for example, by a hardware processor such as a central processing unit (CPU) executing a program (software). Some or all of these components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. Some or all of functions of these components may be implemented by a dedicated LSI circuit. The program may be prestored in a storage device (a storage device including a non-transitory storage medium) such as a hard disk drive (HDD) or a flash memory provided in the host vehicle M or may be stored in a removable storage medium (a non-transitory storage medium) such as a DVD or a CD-ROM and installed in the HDD or the flash memory provided in the host vehicle M when the storage medium is mounted in a drive device provided in the host vehicle M.

The recognizer 120 recognizes a road in the traveling direction in which the host vehicle M travels on the basis of the image data output by the detection device 10. Further, the recognizer 120 recognizes another vehicle V traveling in front of the host vehicle M on the basis of the image data output by the detection device 10. The recognizer 120 outputs information of the recognized road and information of the another vehicle V to the display processor 140.

The road marking recognizer 122 recognizes road markings drawn on the road in the traveling direction in which the host vehicle M travels on the basis of the image data output by the detection device 10. More specifically, the road marking recognizer 122 generates plane view data that represents an area of a road surface in front of the host vehicle M imaged in the image data as if viewed from directly above on the basis of the image data output by the detection device 10. The road marking recognizer 122 recognizes a white line drawn on the road surface in front of the host vehicle M as the road marking from the plane view data that has been generated. The road marking recognizer 122 may recognize road boundaries including a yellow line, a road shoulder, a curbstone, a median strip, a guardrail, and the like as well as the white line. The road marking recognizer 122 outputs information of the recognized road markings to the lane center detector 124. The information of the road marking output by the road marking recognizer 122 to the lane center detector 124 also includes information indicating whether the road marking is a left road marking or a right road marking. This information is determined, for example, according to an angle of view of the image data output by the detection device 10. For example, when one of the road markings cannot be recognized, the road marking recognizer 122 outputs information of the recognized road marking to the lane center detector 124.

The lane center detector 124 detects a center position of a road (a traveling lane) in the traveling direction in which the host vehicle M travels on the basis of the information of the road marking output by the road marking recognizer 122. More specifically, the lane center detector 124 measures a distance between the left and right road markings of the traveling lane, i.e., a width of the traveling lane, for each interval for which a distance from the host vehicle M is a prescribed distance (for example, 50 [m]) from the information of the road marking output by the road marking recognizer 122. When the information of the road marking output by the road marking recognizer 122 does not include information of either the left or right road marking, the lane center detector 124 may, for example, assume the width as a width equal to that of a nearby traveling lane that has been measured when the information of both the left and right road markings is included or assume the width (for example, 3.5 [m]) of a general lane as the width of the traveling lane. The lane center detector 124 detects a middle position of the measured width of the traveling lane, i.e., a half-width position, as the center position of the traveling lane. The lane center detector 124 outputs information indicating the center position detected for each prescribed distance to the curvature estimator 126. The lane center detector 124 is an example of a "detector" in the claims.

Figure 2:
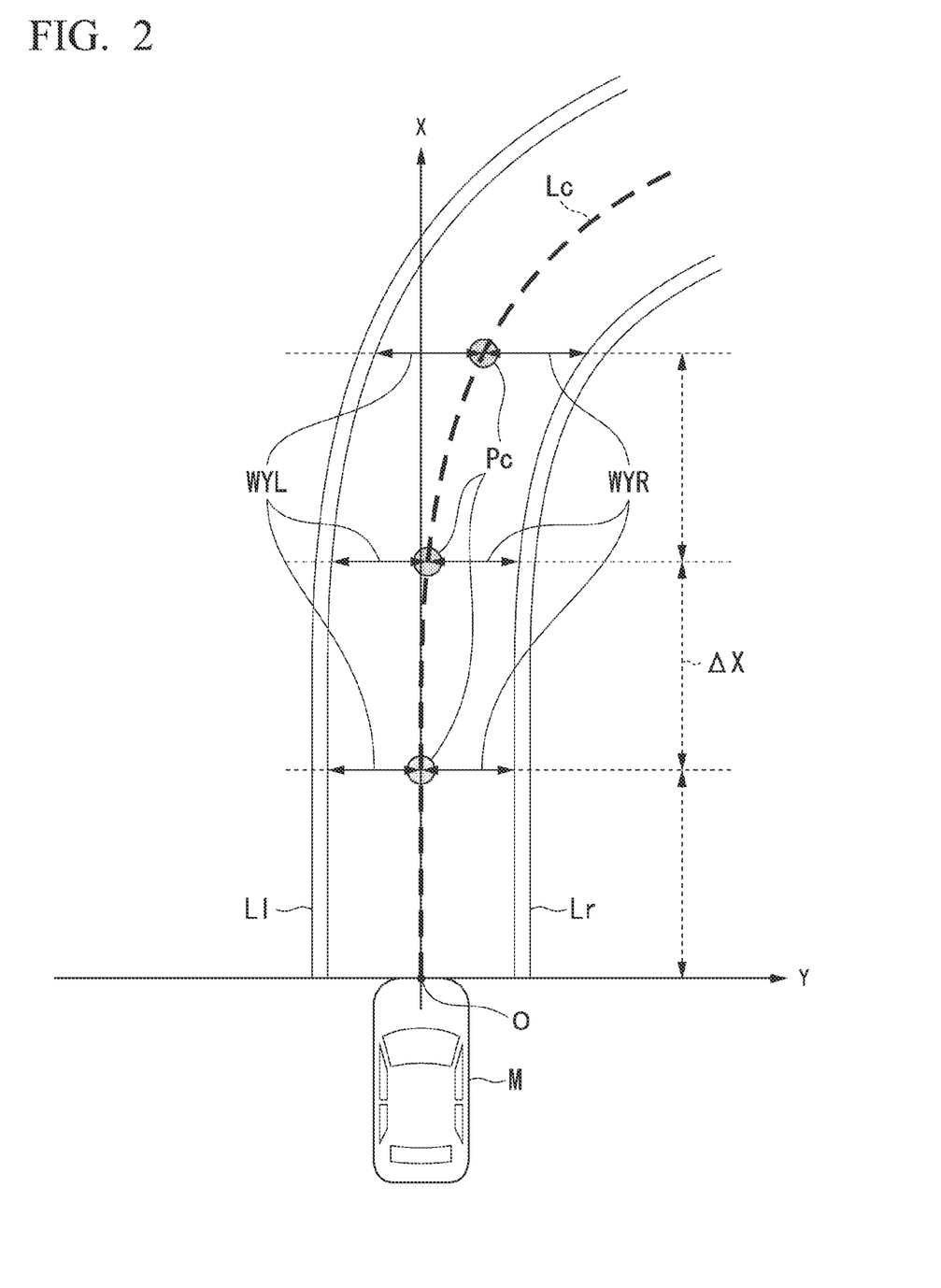
FIG. 2 is a diagram showing an example in which a curvature estimator estimates curvature of a road.

The curvature estimator 126 estimates curvature of the road on which the host vehicle M travels, especially the traveling lane, on the basis of information of each center position output by the lane center detector 124. FIG. 2 is a diagram showing an example in which the curvature estimator 126 estimates the curvature of the road. In FIG. 2, an example in which the curvature estimator 126 estimates curvature of a curved road that curves to the right is shown. In FIG. 2, an example of a road marking L1 on the left side of the traveling lane and a road marking Lr on the right side thereof recognized by the road marking recognizer 122 is also shown. Further, in FIG. 2, an example of a center position Pc for each prescribed distance ΔX at a position where a left width WYL and a right width WYR detected by the lane center detector 124 are equal is shown.

The curvature estimator 126 obtains a centerline Lc of the traveling lane by connecting center positions Pc output by the lane center detector 124. The curvature estimator 126 sets the center of the host vehicle M as the origin O and aligns a start point of the obtained centerline Lc with the origin O. The curvature estimator 126 estimates forward curvature of the traveling lane in which the host vehicle M will travel and pass hereafter on the basis of a left-right difference between a reference X-axis set in a forward direction of the host vehicle M and the centerline Lc. In this way, the curvature estimator 126 sequentially estimates curvatures of the traveling lane in which the host vehicle M will travel. In other words, the curvature estimator 126 always estimates the curvature of the traveling lane in which the host vehicle M will travel on the basis of information of each center position output by the road marking recognizer 122 even if the host vehicle M is traveling on a straight road. Further, the curvature estimator 126 may estimate curvature of the traveling lane in which the host vehicle M will travel, for example, on the basis of map information in which a route to a destination set by the driver of the host vehicle M with respect to a navigation device (not shown) provided in the host vehicle M is shown. The curvature estimator 126 outputs information indicating the estimated forward curvature of the traveling lane to the display processor 140. The curvature estimator 126 is an example of an "estimator" in the claims.

Returning to FIG. 1, the vehicle recognizer 128 recognizes another vehicle V traveling in front of the host vehicle M on the basis of the image data output by the detection device 10. More specifically, the vehicle recognizer 128 recognizes the another vehicle V imaged in the image data on the basis of the image data output by the detection device 10. The vehicle recognizer 128 may recognize the another vehicle V on the basis of the plane view data generated by the road marking recognizer 122. The vehicle recognizer 128 outputs information of the another vehicle V that has been recognized including a position (a direction, a distance, and/or the like) where the another vehicle V that has been recognized is present to the display processor 140 on the basis of the host vehicle M. The information of the another vehicle V output by the vehicle recognizer 128 to the display processor 140 may include information indicating a vehicle type of the another vehicle V (for example, a passenger car, a truck, a motorcycle, or the like).

The display processor 140 generates a surrounding situation display image showing a situation of surroundings of the host vehicle M on the basis of information of the curvature of the traveling lane in a forward direction output by the curvature estimator 126. The display processor 140 may generate the surrounding situation display image including the another vehicle V on the basis of the information of the another vehicle V output by the vehicle recognizer 128. The display processor 140 outputs the generated surrounding situation display image to the display device 20 and causes the display device 20 to display the surrounding situation display image.

Figure 3:
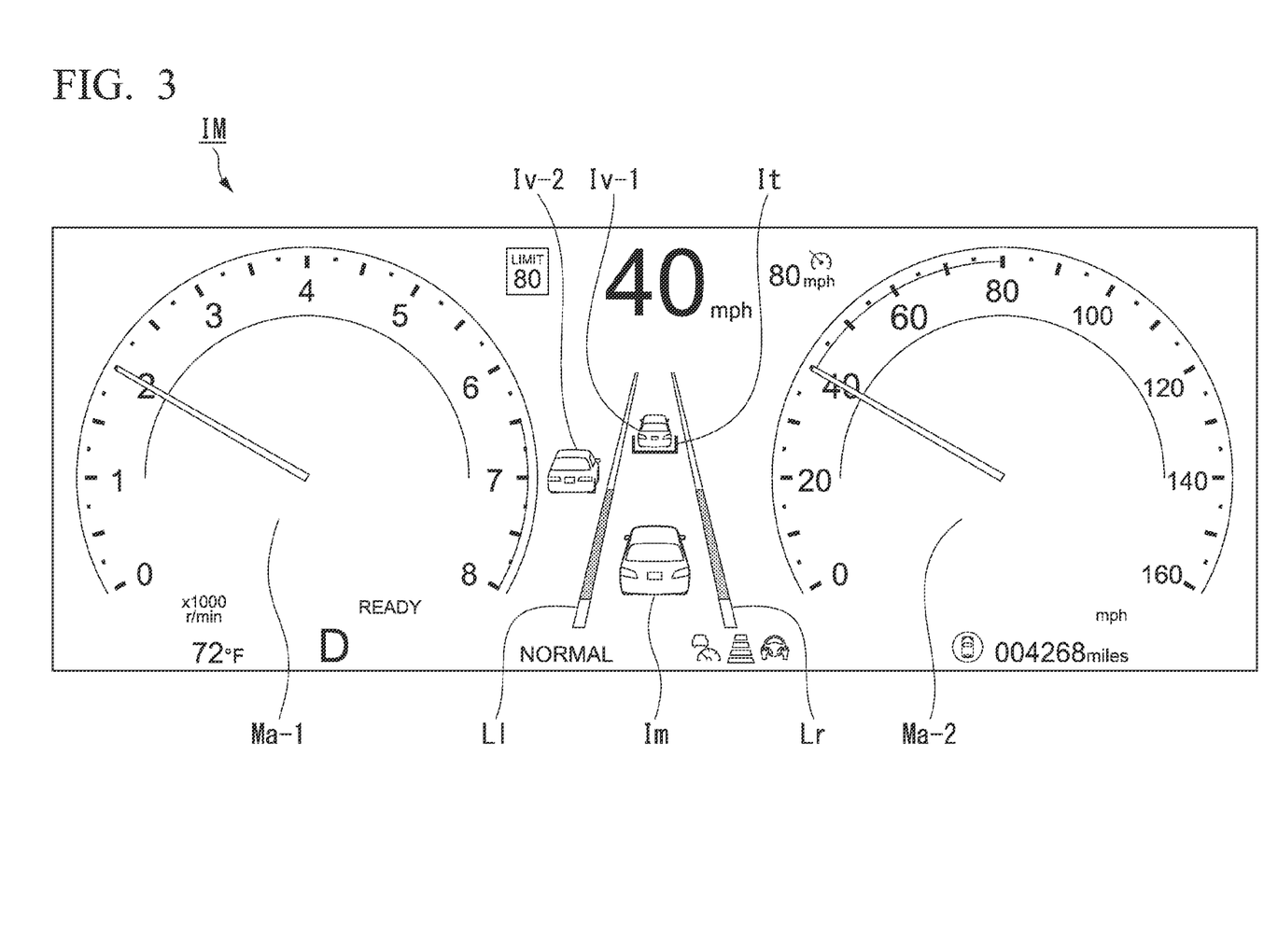
FIG. 3 is a diagram showing an example of a surrounding situation display image.

Here, an example of a surrounding situation display image displayed on the display device 20 by the display processor 140 will be described. FIG. 3 is a diagram showing an example of a surrounding situation display image generated by the display processor 140 and displayed on the display device 20. In FIG. 3, an example of an information image IM displayed in the entire display area of the display device 20 is shown. As described above, the display device 20 displays various types of information to be presented to the driver of the host vehicle M. In the example of the information image IM shown in FIG. 3, a tachometer image Ma-1 is displayed on the left side of the display area, a speedometer image Ma-2 is displayed on the right side thereof, and the surrounding situation display image is displayed at a position therebetween. When the host vehicle M is, for example, an electric vehicle that travels with electric power supplied to the electric motor or an electric vehicle such as a hybrid vehicle, the tachometer image Ma-1 may be replaced with other information or may be omitted. In the information image IM shown in FIG. 3, various types of other information and icons representing the information are displayed. In the information image IM shown in FIG. 3, positions and/or areas where information other than the surrounding situation display image, i.e., the tachometer image Ma-1, the speedometer image Ma-2, and various types of other information, are arranged in the information image IM are predetermined. The tachometer image Ma-1 and the speedometer image Ma-2 are examples of a "traveling state display image" in the claims.

In the surrounding situation display image, for example, a host vehicle icon Im representing the host vehicle M is arranged as a basic configuration at the center thereof, and an image of road markings obtained by simulating the road marking L1 and the road marking Lr is arranged to represent the lane in which the host vehicle M travels. Although the position of the host vehicle icon Im arranged within the surrounding situation display image is predetermined, a shape of the image of the road marking L1 or the road marking Lr (hereinafter simply referred to as the road marking L1 or the road marking Lr) is determined on the basis of information of the curvature of the traveling lane output by the curvature estimator 126 provided in the recognizer 120. The surrounding situation display image shown in FIG. 3 shows an example of a case where the host vehicle M is traveling on a straight road. More specifically, an example in which a forward direction (a depth direction) based on the host vehicle M is represented by setting a shape of the road marking L1 or the road marking Lr as a straight line and decreasing a distance between the road marking L1 and the road marking Lr as a distance from the host vehicle M increases is shown.

Further, in an example of the surrounding situation display image within the information image IM shown in FIG. 3, another vehicle icon Iv-1 representing another vehicle V-1 traveling in front of the host vehicle M and another vehicle icon Iv-2 representing another vehicle V-2 traveling in a traveling lane (an adjacent lane) adjacent to the left side recognized by the vehicle recognizer 128 are arranged at positions corresponding to positions where the another vehicles V are present. The surrounding situation display image does not include information of an intersection present in front of the host vehicle M or another vehicle V passing through the intersection, i.e., crossing the front of the host vehicle M. Although an example in which each another vehicle icon Iv representing a passenger car is arranged in the surrounding situation display image shown in FIG. 3 is shown, a shape of the another vehicle icon Iv may change on the basis of information of the another vehicle V output by the vehicle recognizer 128. That is, the another vehicle icon Iv may be changed to a shape representing a truck or a shape representing a motorcycle.

Further, because a case where the host vehicle M is traveling while tracking the another vehicle V-1 according to a driving assistance function based on adaptive cruise control (ACC) is represented in the example of the surrounding situation display image shown in FIG. 3, a tracking icon It is arranged at a position behind the another vehicle V-1 (below the another vehicle icon Iv-1). In the surrounding situation display image, the distance from the host vehicle M in the depth direction may differ according to whether or not the ACC driving assistance is provided in the host vehicle M. For example, the depth direction may be represented up to 150 [m] when the ACC driving assistance is not provided in the host vehicle M and the depth direction may be represented up to 200 [m] or an available imaging range (i.e., an available detection range) in the detection device 10 when the ACC driving assistance is provided in the host vehicle M.

The display device 20 presents various types of information about the driving of the host vehicle M to the driver of the host vehicle M by displaying an information image such as the information image IM. Information other than the surrounding situation display image included in the information image IM may be generated by a display processor (not shown) different from the display processor 140 or may be generated by the display processor 140 together with the surrounding situation display image. That is, the display processor 140 may generate the entire information image to be displayed on the display device 20 as well as the surrounding situation display image.

Returning to FIG. 1, the display area determiner 142 determines an area where the surrounding situation display image is displayed on the basis of information of the curvature of the traveling lane output by the curvature estimator 126. Thus, the display area determiner 142 sets a prescribed condition for determining the area where the surrounding situation display image is displayed and determines the display area of the surrounding situation display image according to whether or not this condition is satisfied. The fact that the prescribed condition is satisfied indicates that the road marking L1 or the road marking Lr overlaps the tachometer image Ma-1 or the speedometer image Ma-2 when the shape of the road marking L1 or the road marking Lr is determined on the basis of the curvature of the traveling lane output by the curvature estimator 126. More specifically, when the host vehicle M will travel on a straight road in the future, because the curvature of the traveling lane output by the curvature estimator 126 is small, the display area of the surrounding situation display image does not overlap the display areas of the tachometer image Ma-1 and the speedometer image Ma-2 arranged on the left and right of the information image IM even if the road marking L1 or the road marking Lr is determined on the basis of the curvature of the traveling lane. On the other hand, when the host vehicle M will travel on a curved road in the future, if the curvature of the traveling lane output by the curvature estimator 126 becomes large and the road marking L1 or the road marking Lr is determined on the basis of the curvature of the traveling lane, the display area of the surrounding situation display image is likely to overlap the display area of the tachometer image Ma-1 or the speedometer image Ma-2. Therefore, the display area determiner 142 sets a prescribed value for determining the curvature of the traveling lane, i.e., a threshold value. Further, when the another vehicle icon Iv-1 or the tracking icon It is arranged in the surrounding situation display image, the another vehicle icon Iv or the tracking icon It is likely to overlap the display area of the tachometer image Ma-1 or the speedometer image Ma-2. Thus, the display area determiner 142 may make the threshold value set to determine the curvature of the traveling lane different between a case where the another vehicle icon Iv-1 or the tracking icon It is arranged in the surrounding situation display image and a case where the another vehicle icon Iv-1 or the tracking icon It is not arranged in the surrounding situation display image (i.e., a case where the ACC driving assistance is not provided). That is, when the another vehicle icon Iv-1 or the tracking icon It is arranged in the surrounding situation display image, the display area determiner 142 may set the threshold value that is stricter. When the curvature of the traveling lane output by the curvature estimator 126 is greater than or equal to the threshold value, the display area determiner 142 assumes that a prescribed condition is satisfied and outputs information indicating that the prescribed condition is satisfied (hereinafter referred to as "determination information") to the display information generator 144. The determination information output by the display area determiner 142 to the display information generator 144 also includes information indicating whether the overlapping is associated with the display area of the tachometer image Ma-1 or the display area of the speedometer image Ma-2 and information indicating an overlap amount. Information indicating the overlap amount may include information indicating an overlap amount of the road marking L1 or the road marking Lr and further include information indicating an overlap amount of the another vehicle icon Iv-1 or the tracking icon It.

The display information generator 144 generates a surrounding situation display image on the basis of information of the curvature of the traveling lane output by the curvature estimator 126, information of the another vehicle V output by the vehicle recognizer 128, and determination information output by the display area determiner 142. At this time, when the determination information output by the display area determiner 142 indicates that the curvature of the traveling lane is not greater than or equal to the threshold value (or is less than the threshold value), the display information generator 144 determines a shape of the road marking L1 or the road marking Lr representing the curvature of the traveling lane output by the curvature estimator 126 and generates a surrounding situation display image including the road marking L1 or the road marking Lr that has been determined. On the other hand, when the determination information output by the display area determiner 142 indicates that the curvature of the traveling lane is greater than or equal to the threshold value, a shape is determined by decreasing the reference curvature of the road marking L1 or the road marking Lr as compared with the curvature of the traveling lane output by the curvature estimator 126, and a surrounding situation display image including the road marking L1 or the road marking Lr that has been determined is generated. The reference curvature can be curvature for preventing the road marking L1 or the road marking Lr from overlapping the display area of the tachometer image Ma-1 or the speedometer image Ma-2 displayed in a direction represented by the curvature of the traveling lane output by the curvature estimator 126 and can be determined on the basis of an overlap amount included in the determination information. At this time, when the another vehicle icon Iv or the tracking icon It is arranged in the surrounding situation display image, the display information generator 144 determines the reference curvature in accordance with the another vehicle icon Iv or the tracking icon It that has been moved because a movement process (an offset process) is performed so that the another vehicle icon Iv or the tracking icon It does not overlap the tachometer image Ma-1 or the speedometer image Ma-2. The display information generator 144 may determine the reference curvature so that a prescribed interval (gap) from a boundary of the tachometer image Ma-1 or the speedometer image Ma-2 is formed so that boundaries between the tachometer image Ma-1 or the speedometer image Ma-2 and the road marking L1, the road marking Lr, the another vehicle icon Iv, and the tracking icon It are shown more clearly. Here, when the determination information includes information indicating the overlap amount of the another vehicle icon Iv-1 or the tracking icon It, the display information generator 144 may determine the reference curvature on the basis of the overlap amount included in the determination information.

Figure 4:
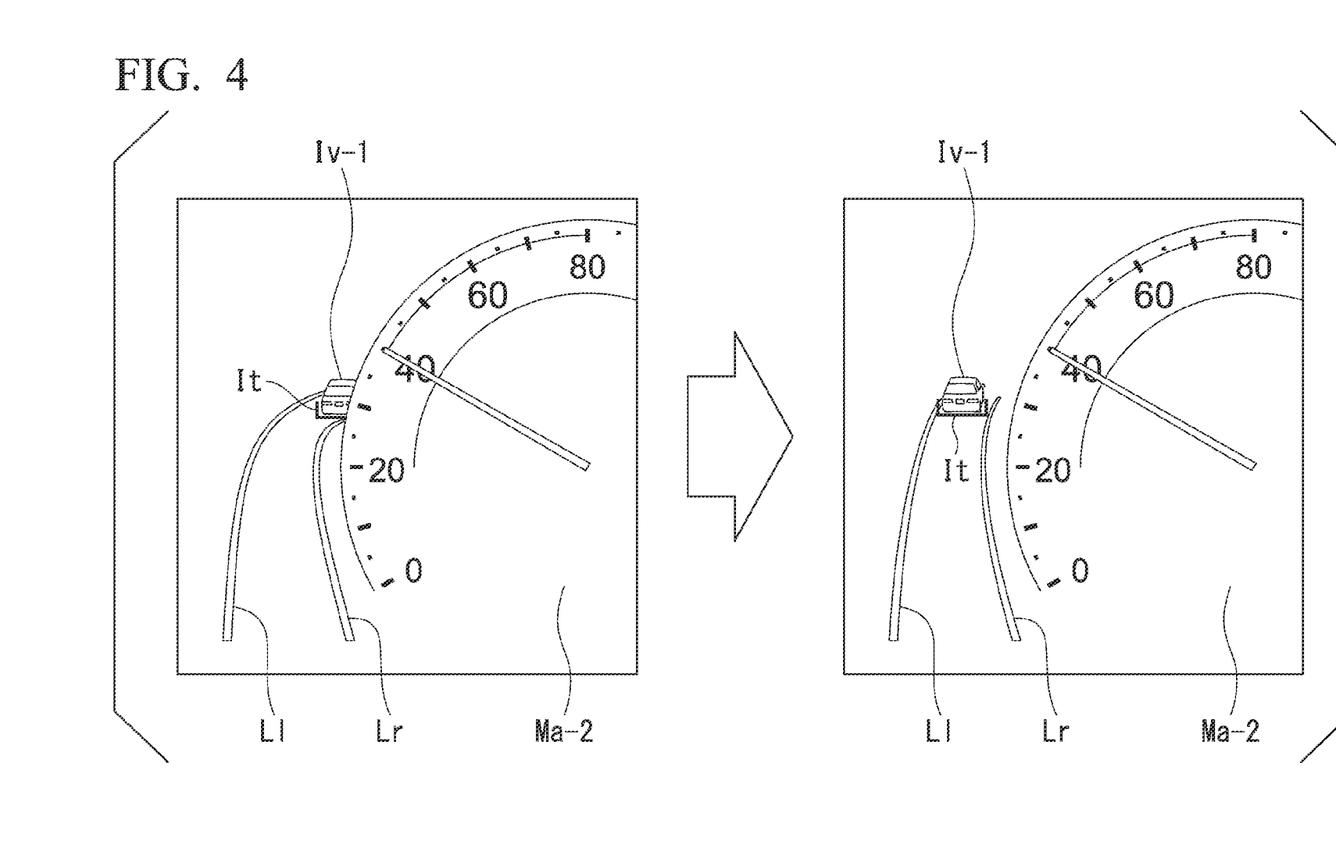
FIG. 4 is a diagram showing an example of a process in which a display information generator changes curvature of a road marking.

Here, an example of a process in which the display information generator 144 decreases the curvature of the road marking L1 or the road marking Lr when the display area determiner 142 determines that a prescribed condition is satisfied will be described. FIG. 4 is a diagram showing an example of a process in which the display information generator 144 changes the curvature of the road marking (the road marking L1 or the road marking Lr). In FIG. 4, an example in which another vehicle V-1 that is being tracked enters a curved road in a right direction and therefore the surrounding situation display image overlaps the speedometer image Ma-2 when the host vehicle M is traveling on a straight road is shown. In this case, when the display information generator 144 determines the road marking L1 or the road marking Lr in a shape representing the curvature of the traveling lane output by the curvature estimator 126, the another vehicle icon Iv-1 and the tracking icon It will overlap the speedometer image Ma-2 as shown on the left side of FIG. 4. In this case, the display area determiner 142 outputs determination information indicating that the curvature of the traveling lane is greater than or equal to the threshold value and including information indicating the overlapping associated with the display area of the speedometer image Ma-2, the overlap amount of the road marking L1 or the road marking Lr, and the overlap amount of the another vehicle icon Iv-1 or the tracking icon It to the display information generator 144. Thereby, the display information generator 144 determines a shape of the road marking L1 or the road marking Lr whose curvature has been decreased, as shown on the right side of FIG. 4. Thereby, the road marking L1 and the road marking Lr do not overlap the speedometer image Ma-2. Further, the display information generator 144 moves the another vehicle icon Iv-1 and the tracking icon It to positions according to determined shapes of the road marking L1 and the road marking Lr. Thereby, the another vehicle icon Iv-1 and the tracking icon It do not overlap with the speedometer image Ma-2, either. The display information generator 144 may first cause the another vehicle icon Iv-1 and the tracking icon It to be moved and may cause the curvatures of the road marking L1 and the road marking Lr to be decreased in accordance with the movement thereof.

In this way, the display information generator 144 generates a surrounding situation display image so that the display area of the surrounding situation display image showing the curvature of the traveling lane output by the curvature estimator 126 or the another vehicle V output by the vehicle recognizer 128 does not overlap at least the tachometer image Ma-1 or the speedometer image Ma-2 on the basis of the determination information output by the display area determiner 142. Here, in the vehicle display control device 100, the curvature estimator 126 estimates the curvature of the traveling lane in which the host vehicle M travels even if the host vehicle M is traveling on a straight road. That is, the vehicle display control device 100 estimates the curvature of the traveling lane from a time point before the host vehicle M travels on a curved road. Thus, the vehicle display control device 100 can decrease the reference curvature of the road marking L1 or the road marking Lr in advance from a point before a point where the host vehicle M approaches a curved road, i.e., where there is a curved road. Thereby, the surrounding situation display image does not give an unnatural feeling of strangeness to the driver of the host vehicle M without a change in the curvature of the road marking L1 or the road marking Lr indicating the traveling lane when the host vehicle M travels on a curved road.

On the right side of FIG. 4, an example in which the road marking Lr, the another vehicle icon Iv-1, and the tracking icon It are all prevented from overlapping the speedometer image Ma-2 is shown. However, for example, the display information generator 144 may be configured to cause the curvature of the road marking L1 or the road marking Lr to be decreased and cause the another vehicle icon Iv-1 and the tracking icon It to be moved so that at least the another vehicle icon Iv-1 does not overlap the speedometer image Ma-2 and the tracking icon It can be confirmed (a part thereof is included in the surrounding situation display image). In this case, the prescribed condition in the display area determiner 142 may be a condition in which the another vehicle icon Iv included in the surrounding situation display image does not overlap the tachometer image Ma-1 or the speedometer image Ma-2.

[Example of Process of Vehicle Display Control Device]

Figure 5:
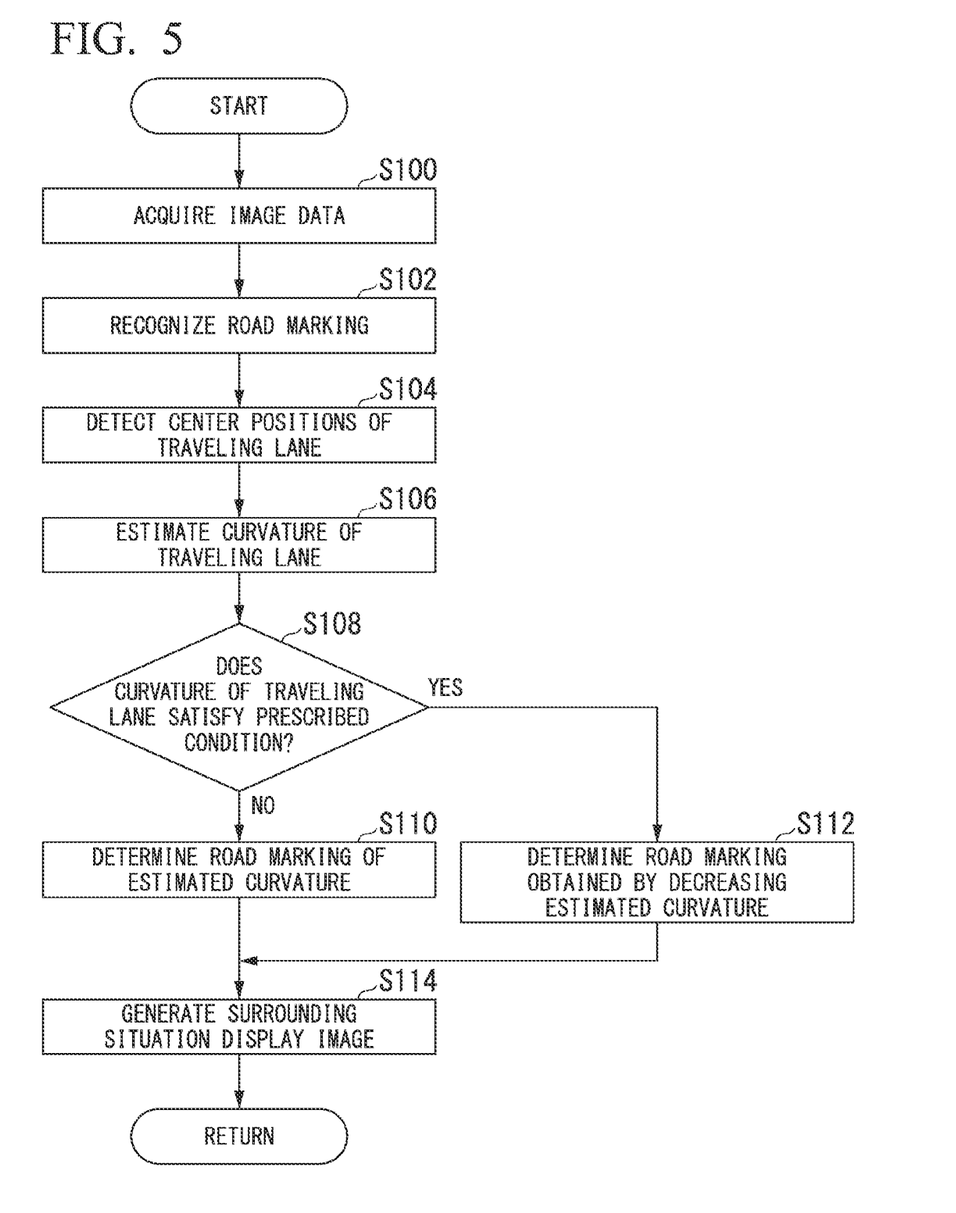
FIG. 5 is a flowchart showing an example of a flow of a process executed by the vehicle display control device.

Next, a process of the vehicle display control device 100 will be described. FIG. 5 is a flowchart showing an example of a flow of a process executed by the vehicle display control device 100. In the following description, it is assumed that each component provided in the vehicle display control device 100 appropriately performs a corresponding process. However, in the following description, it is assumed that another vehicle V traveling near the host vehicle M is not recognized. The process of the present flowchart is iteratively executed at prescribed time intervals for which the detection device 10 images surroundings of the host vehicle M while the host vehicle M is traveling (moving).

When the detection device 10 images the surroundings of the host vehicle M, the vehicle display control device 100 acquires image data from the detection device 10 (step S100).

The road marking recognizer 122 recognizes a road marking on the basis of the acquired image data (step S102). The road marking recognizer 122 outputs information of the recognized road marking to the lane center detector 124. At this time, the vehicle recognizer 128 may recognize another vehicle V traveling in front of the host vehicle M on the basis of the acquired image data and output information of the another vehicle V that has been recognized to the display processor 140.

The lane center detector 124 detects center positions of a traveling lane in which the host vehicle M travels for each prescribed distance on the basis of the information of the road marking output by the road marking recognizer 122 (step S104). The lane center detector 124 outputs information indicating the detected center positions to the curvature estimator 126.

The curvature estimator 126 estimates curvature of the traveling lane in which the host vehicle M travels on the basis of the information of the center positions output by the lane center detector 124 (step S106). The curvature estimator 126 outputs information indicating the estimated curvature of the traveling lane to the display processor 140.

The display area determiner 142 determines whether or not a display area of a surrounding situation display image satisfies a prescribed condition on the basis of the information of the curvature of the traveling lane output by the curvature estimator 126 (step S108). Here, the display area determiner 142 determines whether or not the curvature of the traveling lane is greater than or equal to a set threshold value. At this time, when the information of the another vehicle V detected from the vehicle recognizer 128 has been output, the display area determiner 142 determines whether or not a prescribed condition including the another vehicle icon Iv to be displayed on the surrounding situation display image is satisfied. Further, when ACC driving assistance has been provided in the host vehicle M, the display area determiner 142 determines whether or not a prescribed condition including the tracking icon It is satisfied. In step S108, when it is determined that the display area of the surrounding situation display image does not satisfy the prescribed condition (here, the curvature of the traveling lane is less than the threshold value), i.e., the surrounding situation display image does not overlap the tachometer image Ma-1 or the speedometer image Ma-2, the display area determiner 142 outputs determination information indicating a determination result to the display information generator 144.

When the determination information indicating that the prescribed condition is not satisfied is input from the display area determiner 142, the display information generator 144 determines a road marking L1 and a road marking Lr in a shape in which reference curvature has not been decreased, i.e., a shape representing the traveling lane of the curvature estimated by the curvature estimator 126 (step S110).

On the other hand, in step S108, when it is determined that the display area of the surrounding situation display image satisfies the prescribed condition (here, the curvature of the traveling lane is greater than or equal to the threshold value), i.e., the surrounding situation display image overlaps the tachometer image Ma-1 or the speedometer image Ma-2, the display area determiner 142 outputs determination information indicating a determination result to the display information generator 144.

When the determination information indicating that the prescribed condition is satisfied is input from the display area determiner 142, the display information generator 144 determines the road marking L1 and the road marking Lr in a shape in which the curvature estimated by the curvature estimator 126 has been decreased (step S112). At this time, when the another vehicle icon Iv or the tracking icon It is displayed in the surrounding situation display image, the display information generator 144 determines shapes of the road marking L1 and the road marking Lr together with a movement amount (an offset amount) of the another vehicle icon Iv or the tracking icon It to be displayed.

The display information generator 144 generates a surrounding situation display image including the road marking L1 and the road marking Lr having the determined shapes (step S114). At this time, when another vehicle icon Iv or a tracking icon It is displayed in the surrounding situation display image, the display information generator 144 generates the surrounding situation display image including the another vehicle icon Iv or the tracking icon It. The display information generator 144 causes a situation of the surroundings of the host vehicle M to be presented to the driver by outputting the generated surrounding situation display image to the display device 20 and causing the display device 20 to display the surrounding situation display image. The vehicle display control device 100 ends the process of the present flowchart for currently acquired image data.

According to the above-described configuration and process, the vehicle display control device 100 acquires image data obtained in an imaging process of the detection device 10 and estimates curvature of a curved road present in a road on which the host vehicle M will travel hereafter. The vehicle display control device 100 determines whether or not the display area of the surrounding situation display image including the road marking L1 and the road marking Lr representing the curved road in the shape representing the estimated curvature overlaps at least a display area of a traveling state display image showing a traveling state of the host vehicle M displayed on the display device 20 (here, the tachometer image Ma-1 or the speedometer image Ma-2). When the display area of the surrounding situation display image overlaps the display area of the traveling state display image, the vehicle display control device 100 generates a surrounding situation display image in which the curvatures of the road marking L1 and the road marking Lr included in the surrounding situation display image are decreased (together with the movement of the another vehicle icon Iv or the tracking icon It) and causes the display device 20 to display the generated surrounding situation display image. That is, the vehicle display control device 100 can cause the road marking L1 and the road marking Lr to be continuously displayed on the display device 20 all the time (together with the another vehicle icon Iv or the tracking icon It). Thereby, in the host vehicle M in which the vehicle display control device 100 is mounted, it is possible to avoid a case where a display area of a shape of a road on which the host vehicle M will travel hereafter and a state in which the another vehicle V is being tracked displayed in the surrounding situation display image overlaps the traveling state display image (or is hidden thereby) and is not ascertained. Thereby, the driver of the host vehicle M in which the vehicle display control device 100 is mounted can cause the host vehicle M to travel while confirming a recognition situation of the vehicle in a state in which information of a relative positional relationship associated with another vehicle V present near the host vehicle M or a positional relationship associated with another vehicle V that is being tracked is not damaged. Although not shown, the display area of the surrounding situation display image may be a limited area in which the traveling state display is formed in a circle, a rectangle, or the like, a blank area is formed in the center of the circle or the rectangle, and the blank area includes a display area of the surrounding situation display image. Even in this case, it is possible to make avoidance for preventing overlapping associated with the traveling state display image in a similar determination process.

According to the above-described embodiment, the vehicle display control device 100 includes the curvature estimator 126 configured to estimate curvature of a road on which the host vehicle M will travel on the basis of at least an output of the detection device 10 that detects a target object (a road marking or another vehicle V) present in a traveling direction of the host vehicle M; and the display processor 140 configured to cause the display device 20 to display a surrounding situation display image including a host vehicle icon Im representing the host vehicle M and an image of a road marking (the road marking L1 and the road marking Lr) whose shape is determined on the basis of the curvature, wherein the display processor 140 decreases reference curvature of the image of the road marking included in the surrounding situation display image if a prescribed condition is satisfied, so that a driver can be allowed to recognize a relative positional relationship associated with surroundings of the host vehicle M or another vehicle V. Thereby, the driver of the host vehicle M in which the vehicle display control device 100 is mounted can cause the host vehicle M to travel while confirming a recognition situation of the vehicle in a state in which information of a relative positional relationship associated with the another vehicle V present near the host vehicle M or a positional relationship associated with the another vehicle V that is being tracked is not damaged.

The embodiment described above can be represented as follows.

A vehicle display control device including:

a hardware processor, and a storage device storing a program, wherein the hardware processor reads and executes the program stored in the storage device to:

estimate curvature of a road on which a host vehicle will travel based on at least an output of a detection device that detects a target object present in a traveling direction of the host vehicle; and when a display device is allowed to display a surrounding situation display image including a host vehicle icon representing the host vehicle and an image of a road marking whose shape is determined based on the curvature, decrease reference curvature of the image of the road marking included in the surrounding situation display image if a prescribed condition is satisfied.

Although modes for carrying out the present invention have been described using embodiments, the present invention is not limited to the embodiments and various modifications and substitutions can also be made without departing from the scope and spirit of the present invention.

What is claimed is:

1. A vehicle display control device comprising a processor configured to execute computer-readable instructions to perform:
estimating curvature of a road on which a host vehicle will travel based on at least an output of a detection device that detects a target object present in a traveling direction of the host vehicle;
causing a display device to display a surrounding situation display image including a host vehicle icon representing the host vehicle and an image of a road marking whose shape is determined based on the curvature; and
decreasing reference curvature of the image of the road marking included in the surrounding situation display image if a prescribed condition is satisfied.

2. The vehicle display control device according to claim 1, wherein the prescribed condition is a condition in which the estimated curvature is greater than or equal to a prescribed value.

3. The vehicle display control device according to claim 1,
wherein the display device displays a traveling state display image on at least one of left and right sides of the surrounding situation display image,
wherein the prescribed condition is a condition in which the image of the road marking overlaps the traveling state display image when the shape of the image of the road marking has been determined based on the estimated curvature, and
wherein the processor is configured to execute the computer-readable instructions to perform:
decreasing the curvature to curvature at which the image of the road marking does not overlap the traveling state display image if the prescribed condition is satisfied.

4. The vehicle display control device according to claim 1,
wherein the display device displays two traveling state display images on left and right sides of the surrounding situation display image, and
wherein the processor is configured to execute the computer-readable instructions to perform:
causing the surrounding situation display image to be displayed at a position between the two traveling state display images.

5. The vehicle display control device according to claim 1,
wherein the processor is configured to execute the computer-readable instructions to perform:
detecting center positions of the road in the traveling direction in which the host vehicle travels based on the output of the detection device,
estimating the curvature of the road based on a centerline connecting the center positions.

6. The vehicle display control device according to claim 1,
wherein the processor is configured to execute the computer-readable instructions to perform:
estimating the curvature of the road based on map information indicating a route along which the host vehicle travels.

7. The vehicle display control device according to claim 1,
wherein the processor is configured to execute the computer-readable instructions to perform:
estimating the curvature of the road at a time point when the host vehicle is traveling on a straight road whose curvature is less than a prescribed value and there is a curved road whose curvature is greater than or equal to the prescribed value on a traveling direction side, and
decreasing the reference curvature of the image of the road marking included in the surrounding situation display image from a point before a point where the curved road is present.

8. The vehicle display control device according to claim 1,
wherein the target object further includes another vehicle that travels in front of the host vehicle,
wherein the processor is configured to execute the computer-readable instructions to perform:
including another vehicle icon representing the another vehicle at a position within the surrounding situation display image corresponding to a position where the another vehicle is present; and
including a tracking icon representing that the host vehicle is tracking the another vehicle at a position near the another vehicle icon in the surrounding situation display image when the host vehicle is traveling while tracking the another vehicle and causes the display device to display the surrounding situation display image.

9. The vehicle display control device according to claim 8,
wherein the prescribed condition is a condition in which at least a part of the another vehicle icon overlaps a traveling state display image when the tracking icon is included in the surrounding situation display image, and
wherein the processor is configured to execute the computer-readable instructions to perform:
causing the another vehicle icon and the tracking icon to be moved to positions where the another vehicle icon and the tracking icon do not overlap the traveling state display image when the prescribed condition is satisfied and decreases the curvature of the image of the road marking in accordance with the another vehicle icon and the tracking icon that have been moved.

10. The vehicle display control device according to claim 9,
wherein the processor is configured to execute the computer-readable instructions to perform:
causing the another vehicle icon and the tracking icon to be moved to cause at least the another vehicle icon included in the surrounding situation display image does not completely overlap the traveling state display image and a part of the tracking icon is included in the surrounding situation display image.

11. A control method of a vehicle display control device comprising:
estimating, by a computer, curvature of a road on which a host vehicle will travel based on at least an output of a detection device that detects a target object present in a traveling direction of the host vehicle; and
when a display device is allowed to display a surrounding situation display image including a host vehicle icon representing the host vehicle and an image of a road marking whose shape is determined based on the curvature, decreasing, by the computer, reference curvature of the image of the road marking included in the surrounding situation display image if a prescribed condition is satisfied.

12. A non-transitory computer-readable storage medium storing a program for causing a computer to:
estimate curvature of a road on which a host vehicle will travel based on at least an output of a detection device that detects a target object present in a traveling direction of the host vehicle; and when a display device is allowed to display a surrounding situation display image including a host vehicle icon representing the host vehicle and an image of a road marking whose shape is determined based on the curvature, decrease reference curvature of the image of the road marking included in the surrounding situation display image if a prescribed condition is satisfied.

* * * * *